United States Patent
Mulvey et al.

(10) Patent No.: US 7,111,248 B2
(45) Date of Patent: Sep. 19, 2006

(54) ALPHANUMERIC INFORMATION INPUT METHOD

(75) Inventors: Joseph Mulvey, Palatine, IL (US); Pierre Demartines, San Francisco, CA (US)

(73) Assignee: Openwave Systems Inc., Redwood City, CA (US)

( * ) Notice: Subject to any disclaimer, the term of this patent is extended or adjusted under 35 U.S.C. 154(b) by 455 days.

(21) Appl. No.: 10/047,913

(22) Filed: Jan. 15, 2002

(65) Prior Publication Data
US 2004/0201607 A1 Oct. 14, 2004

(51) Int. Cl.
*G06F 3/00* (2006.01)
*G06F 3/14* (2006.01)

(52) U.S. Cl. .......... 715/812; 715/708; 715/811; 715/816; 345/156; 345/157; 345/173

(58) Field of Classification Search ........ 345/156–158, 345/169, 173, 705, 708, 709, 710, 744, 745, 345/789, 812, 816, 864; 715/512, 702, 705, 715/708–710, 764, 765, 810–812, 816, 864
See application file for complete search history.

(56) References Cited

U.S. PATENT DOCUMENTS

| | | | |
|---|---|---|---|
| 4,737,980 A | 4/1988 | Curtin et al. | |
| 5,479,536 A * | 12/1995 | Comerford | 382/230 |
| 5,491,758 A * | 2/1996 | Bellegarda et al. | 382/187 |
| 5,535,323 A | 7/1996 | Miller et al. | |
| 5,557,607 A | 9/1996 | Holden | |
| 5,559,988 A | 9/1996 | Durante et al. | |
| 5,570,348 A | 10/1996 | Holden | |
| 5,583,861 A | 12/1996 | Holden | |
| 5,586,225 A | 12/1996 | Onizuka et al. | |
| 5,590,359 A | 12/1996 | Sharangpani | |
| 5,623,406 A | 4/1997 | Ichbiah | |
| 5,671,426 A | 9/1997 | Armstrong, III | |
| 5,704,060 A | 12/1997 | Del Monte | |
| 5,748,512 A * | 5/1998 | Vargas | 708/142 |
| 5,755,171 A | 5/1998 | Tsukahara | |
| 5,797,098 A | 8/1998 | Schrolder et al. | |
| 5,805,911 A | 9/1998 | Miller | |
| 5,818,437 A | 10/1998 | Grover et al. | |
| 5,896,321 A | 4/1999 | Miller et al. | |
| 5,945,928 A | 8/1999 | Kushler et al. | |

(Continued)

FOREIGN PATENT DOCUMENTS

EP 1031913 A2 * 8/2000

(Continued)

OTHER PUBLICATIONS

U.S. Appl. No. 60/427,256.*

(Continued)

*Primary Examiner*—Lucila X. Bautista
(74) *Attorney, Agent, or Firm*—Townsend and Townsend and Crew LLP

(57) ABSTRACT

An alphanumeric information entry process that includes provision and use of a personal context model that correlates various examples of user context against a unique personal language model for the user. The personal language model itself along with considerable correlation examples can be developed by statistical analysis of user documents and files including particularly email files (including address books). Such processing can be done locally or remotely. The personal context model is used to predict subsequent alphanumeric entries for a given user. In one embodiment predictions are presented one word at a time. Predictions can be automatically changed in one embodiment when the user fails to make any input for a predetermined period of time.

28 Claims, 3 Drawing Sheets

U.S. PATENT DOCUMENTS

| | | | |
|---|---|---|---|
| 5,952,942 A | 9/1999 | Balakrishnan et al. | |
| 5,953,541 A | 9/1999 | King et al. | |
| 6,005,549 A | 12/1999 | Forest | |
| 6,011,554 A * | 1/2000 | King et al. | 345/811 |
| 6,032,053 A | 2/2000 | Schroeder et al. | |
| 6,097,935 A | 8/2000 | Takahashi et al. | |
| 6,167,412 A | 12/2000 | Simons | |
| 6,204,848 B1 | 3/2001 | Nowlan et al. | |
| 6,219,731 B1 | 4/2001 | Gutowitz | |
| 6,223,059 B1 | 4/2001 | Haestrup | |
| 6,286,064 B1 | 9/2001 | King et al. | |
| 6,307,548 B1 | 10/2001 | Flinchem et al. | |
| 6,307,549 B1 | 10/2001 | King et al. | |
| 6,542,170 B1 * | 4/2003 | Williams et al. | 715/816 |
| 6,646,573 B1 * | 11/2003 | Kushler et al. | 341/28 |
| 6,803,864 B1 * | 10/2004 | Chan | 341/22 |
| 2004/0021691 A1 * | 2/2004 | Dostie et al. | 345/773 |
| 2004/0096043 A1 * | 5/2004 | Timmins et al. | 379/88.22 |

FOREIGN PATENT DOCUMENTS

| | | | |
|---|---|---|---|
| JP | 62-278688 | * | 12/1987 |
| JP | 08-292942 | * | 11/1996 |
| JP | 09-153116 | * | 6/1997 |
| JP | 11-212967 | * | 8/1999 |
| JP | 2000-148913 | * | 5/2000 |

OTHER PUBLICATIONS

U.S. Appl. No. 60/447,387.*

Toshiyuki Masui; "*An Efficient text Input Method for Handheld and Ubiquitous Computers*".

James Raymond Davis; "*Let Your Fingers do the Spelling: Implicit disambiguation of words spelled with the telephone keypad*".

Richard Simpson and Heidi Horstmann Koester; "*An Adaptive Word Prediction Interface*".

* cited by examiner

ALPHANUMERIC INFORMATION INPUT METHOD

TECHNICAL FIELD

This invention relates generally to user interfaces and more particularly to user interfaces that convert user input into alphanumeric information.

BACKGROUND

An increasing number of user devices require an increasing amount of user input and often that user input represents alphanumeric information such as, for example, the text of a message or the address of a recipient. At the same time, many user devices, and especially portable user devices, are becoming smaller. Smaller form factors unfortunately reduce the amount of physical space available for the user interface (this tends not only to impact the user input mechanism but also corresponding output mechanisms, memory, and computational resources as also support the overall user interface). As a result, various existing user interfaces tend to be unsatisfactory for one reason or another.

This general dissatisfaction exists essentially regardless of the input modality itself (including keyboards and keypads, speech recognition, handwriting recognition, and more exotic input mechanisms such as those driven by alpha waves and other biological electromagnetic signals and fields). Such approaches tend to be too large and/or require too much in the way of device resources (such as memory or computational capability), and/or are otherwise time consuming, tedious, error prone, and for many users tend to discourage rather than encourage usage. Generally put, present solutions for small user devices often tend to result in a poor user experience, one way or the other, ranging from an inability to properly utilize the input mechanism to an uncomfortably high and fatiguing cognitive load to achieve what amounts to modestly acceptable performance for the input mechanism.

Recognition techniques (or, for some keypad-based input mechanisms, so-called predictive techniques) attempt to address these issues by resolving ambiguous input data into words that presumably a user is likely to input into the device. Such techniques are usually based upon standard models that represent common word usage amongst a sampling study, along with other statistical information (for example the distribution of character shapes for a so-called handwriting recognizer). As a result, these techniques can work well for some users and quite poorly for others. Further, such techniques often require considerable training as the user interface is not sufficiently intuitive to the user. In addition, even users for whom the technique works relatively well often find that the technique does not work equally well for all of their needs (for example, the resultant selections may be relatively useful when supporting creation of a business-related message but relatively unhelpful or even annoying when the user creates more casual correspondence).

As a partial remedy for this concern, it has been suggested that such standard models can be augmented by using an additional dictionary of words that the user must create and customize. While this approach can improve recognition for a given user, the editing process itself can be time consuming, tedious, and otherwise typify some of the same problems that the predictive techniques were initially trying to alleviate. In addition, such solutions tend to be highly consumptive of both memory and processing capacity. These needs can render such techniques ill suited for many portable user devices where these resources are either limited or other corresponding limitations of concern exist (such as respecting a need to minimize current consumption in a portable device).

Simply put, present user input devices and techniques do not provide, especially for small user devices, a suitable and relatively intuitive user input interface that will reduce the time and associated cognitive load required to accurately input alphanumeric information, either for a given input modality or in compatible cooperation with a variety of input modalities.

BRIEF DESCRIPTION OF THE DRAWINGS

The above needs are at least partially met through provision of the alphanumeric information input method described in the following detailed description, particularly when studied in conjunction with the drawings, wherein.

Skilled artisans will appreciate that elements in the figures are illustrated for simplicity and clarity and have not necessarily been drawn to scale. Also, some components may be shown in reduced number in order to render more clearly an understanding of various embodiments of the present invention.

SUMMARY

A prediction engine that receives data meant to represent alphanumeric information from a user and predicts at least one additional item of alphanumeric information based upon that received data and upon a personal context model for that user is disclosed. The personal context model includes both a personal language model that represents a statistical analysis of prior alphanumeric content for this particular user and context markers that correlate to the personal language model in significant and dynamic ways.

DETAILED DESCRIPTION

Generally speaking, the various embodiments described below provide, support provision of, or utilize a prediction engine that receives data meant to represent alphanumeric information from a user (including all manner of font-representable characters and symbols) and predicts at least one additional item of alphanumeric information based upon that received data and upon a personal context model for that user. The personal context model includes both a personal language model that represents a statistical analysis of prior alphanumeric content for this particular user and context markers that correlate to the personal language model in significant and dynamic ways. The prediction is then typically presented to the user. Preferably, one word-only predictions are presented as part of an overall strategy to minimize cognitive load on the user (even when other candidate predictions exist) (as used herein, "word" refers to a single sequence of one or more alphanumeric characters representing a semantic unit, and includes traditional words as one finds in a dictionary, so-called texting language (such as using "u" for "you" or "L8R" for "later"), so-called emoticons (such as ":-)" or the corresponding font character "☺" to express happiness), font-based symbols (alone or in combination with other symbols or alphanumeric characters, such as "I?U"), and other expressions of various kinds (such as all or part of Internet addresses, telephone numbers, passwords, credit card numbers, and so forth). In one embodiment, the personal context model is created by use of existing alphanumeric material of the user, including email files. This greatly facilitates provision of a vocabulary that is relevant to the user and that also allows the contextual links to be noted as mentioned above.

Figure 1:
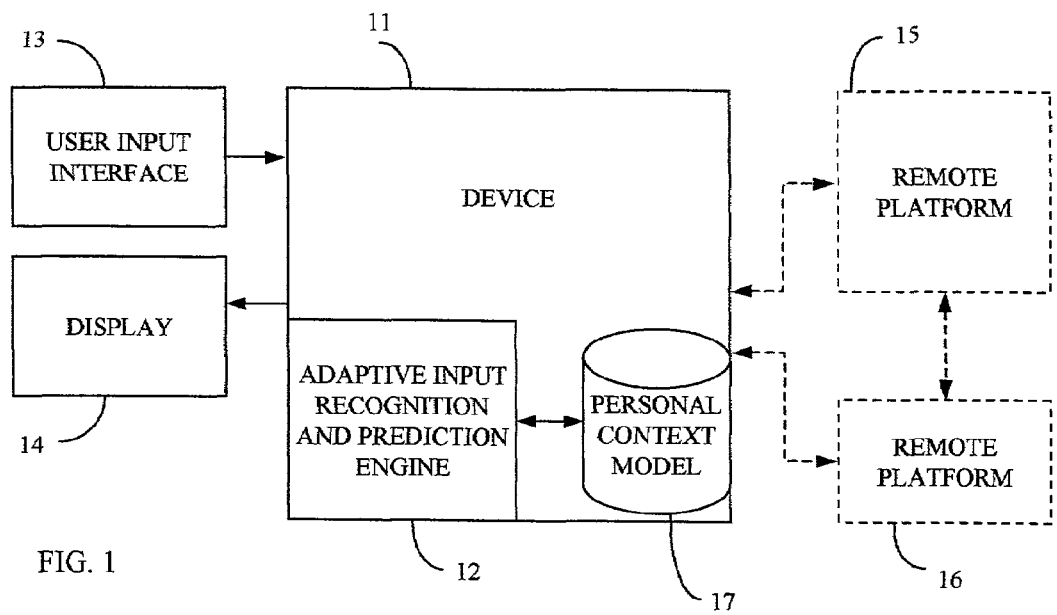
FIG. 1 comprises a block diagram depiction of various user and system operating embodiments in accordance with the invention.

Referring now to FIG. 1, a suitable working environment for practice of various embodiments in accordance with the invention includes a user device 11 having an adaptive input recognition and prediction engine 12 and a personal context model 17 included therewith, a user input interface 13, and a display 14. The device 11 will typically constitute an electronic device such as, but not limited to, a communication device (for example, cellular telephones, 2-way radios, pagers, and so forth), personal digital assistant, pre-recorded audio playback device (for example, MP3 and CD players), remote control, teletext interface as used in some countries to facilitate interactive television services, computer (including both desktop, laptop, and other portable variations), or portable or desktop game module. It will also be seen that the device 11 can itself constitute a component in other products, including various consumer electronic devices (clocks, radios, stereo components, and kitchen appliances to name a few illustrative examples) where the device would facilitate some type of alphanumeric information exchange between a user and the other product.

The user input interface 13 essentially serves to detect bio-sourced physical indicia from a user to thereby transduce such indicia into corresponding alphanumeric information. Examples include keypads with one or more keys that can be physically asserted by a user, script (including both cursive and printed handwriting) input devices, audio-responsive inputs (including voice recognition mechanisms), and a wide variety of electromagnetic biological signal transducers (including devices responsive to muscle flexure, brain waves, eye movement, and so forth). The display 14 will usually comprise a visual display of size and nature as appropriate to the given application that presents alphanumeric characters (other options, including text-to-speech or other user feedback mechanism, can serve as well when appropriate to a given application).

The device 11 will typically include an adaptive input recognition and prediction engine 12 as an integrated element thereof (this can be done through dedicated integrated hardware and/or software) though these elements could be made more severable as might be appropriate to a given application. Many suitable candidate devices 11 already have a microprocessor and for such devices a substantially or fully software implemented embodiment would probably often be a preferred approach (additional detail regarding the adaptive input recognition and prediction engine 12 will be presented below).

In addition, as may be appropriate to some embodiments, a remote platform 15 and/or one or more alternative user platforms 16 can interface to each other and/or to the user device 11. Examples will be provided below.

The adaptive input recognition and prediction engine 12 uses a personal context model 17 to both recognize ambiguous input and provide completion and prediction capability. In order for the adaptive input recognition and prediction engine 12 to function optimally, the personal context model 17 needs to represent a personal context model for the user in question. To some extent, such a model can include a certain amount of generic or at least categorical content. Pursuant to these embodiments, however, the model will preferably contain considerable content that is uniquely developed from and for the user in question, hence making the context model a personal context model. As depicted, the personal context model 17 comprises an integral part of the device 11 itself. The personal context model 17 can typically reside in the device 11, or, if desired, can reside in a separate portable device. Such a portable device (such as a small memory and associated interface mechanism) could hold a user's current personal context model and provide this model to whatever device 11 the user coupled the portable device to (using, for example, USB or other known data porting mechanisms or standards). In this way, a user could utilize a variety of devices during the course of a day without necessarily having each such device constantly maintain that user's personal context model in its own resident memory.

Figure 2:
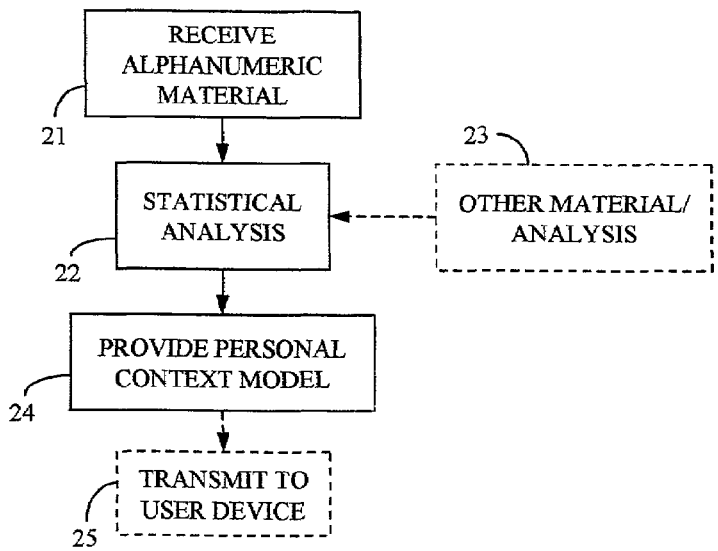
FIG. 2 comprises a flow diagram depicting various embodiments of a process in accordance with the invention.

Pursuant to one embodiment, and referring now to FIG. 2, at least portions of the personal context model can be developed and installed in the user device 11 prior to significant use of the device 11 (thus allowing the user to begin use without any training or explicit user-directed customization of the model). In particular, pre-existing alphanumeric material from the user can be received 21 and statistically analyzed 22. The alphanumeric material itself can include email files for the user, including subject matter content, address book content, and even the unique language usage and patterns of the individual user. The subject matter content can be statistically analyzed to note, in general, individual words that tend to be used with notable frequency by this particular user as well as word pairs (or longer expressions or phrases) that similarly occur in this user's communications with frequent occurrence. Such analysis can be used in general to create a personal language model that includes words (and word sequences) that are relatively likely to be used by this particular user.

In addition, a considerable amount of context information will typically be included with such email files. For example, a given email has corresponding identified recipients, a time and day of transmission, a subject header and the like. Such information can be used to better inform the statistical analysis of the textual information. For example, the analysis can discern that one set of specific unique words and/or expressions tends to be used when the user is sending messages to a given individual. These correlations, when statistically significant, can be noted and used to create a personal context model. As another example, the analysis can discern that another set of specific unique words or expressions tends to be used when the user is sending messages at a particular time of day (for example, communications created between 11:30 AM and 12:15 PM may, for a given user, be statistically more likely to include the words "lunch," "eat," and "Fred's diner." As a result, the personal context model includes not only words (and word sequences) that are likely to be used by a given user, but also correlations between such usage and discernable user contexts. For example, while it will be discerned that a given user might use the expression "John Doe" more frequently than any other multiple word expression that contains the word "John," it will also be discerned that, on Wednesdays, "John" is more likely to be used in the multiple word expression "John White" (because, presumably, the user tends, on that day, to regularly source communications to the latter individual). As noted below, combining the unique vocabulary of a user with correlations between specific instances of usage and various user contexts allows for rapid and relatively reliable prediction of intended subsequent alphanumeric information when a user is inputting information to the user device 11.

Figure 3:
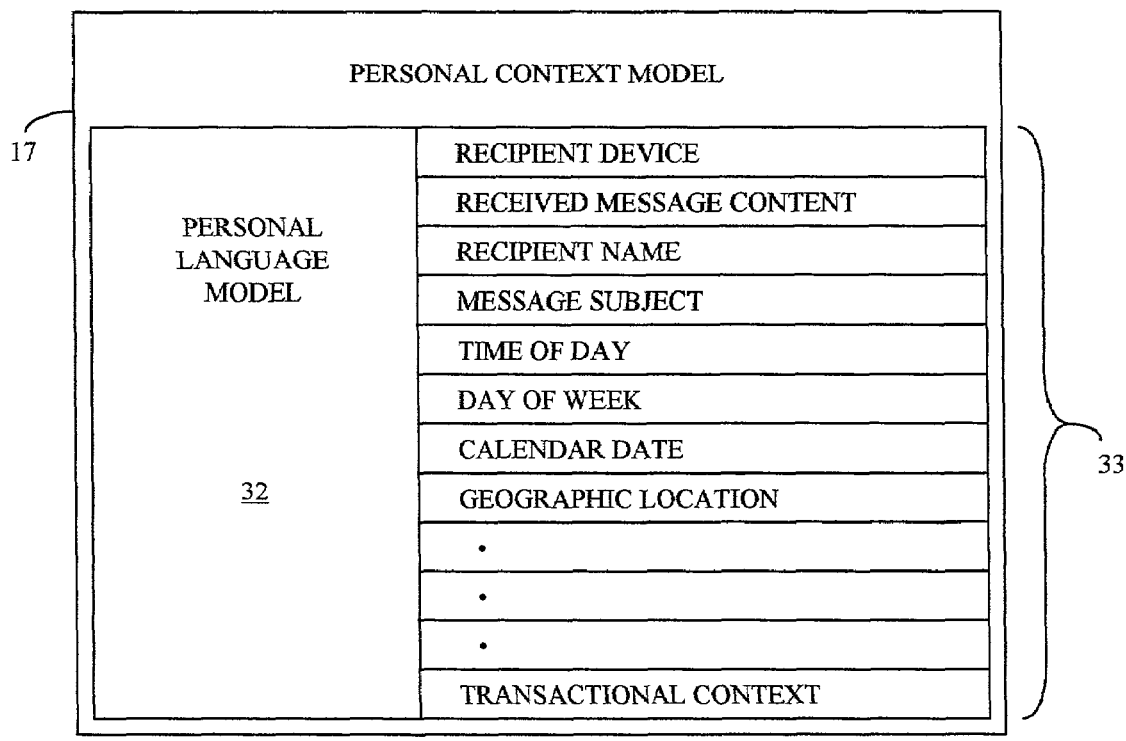
FIG. 3 comprises a representative depiction of potential contents of a personal context model in accordance with various embodiments of the invention.

With momentary reference to FIG. 3, the personal context model 17 so developed includes a personal language model 32 containing words and word sequences that are of greater likelihood to be used by the given individual for whom the personal context model 17 is made as well as correlations between these words and their usage with a variety of user contexts 33. If desired, only one or two such contexts can be used, however, greater reliability can in most cases be achieved with more contextual information. Some useful contexts include the nature of a recipient's device (for example, a pager or other short message service as distinguished from a standard computer email account), the content of a message to which the user is presently replying, the content of previous messages to this particular recipient, the recipient's name, the present time of day, the present day (of the week, month, or as a calendar date), the subject line for the message, a given geographic location, heading, speed of travel, and so forth (when that information is known and available), and a given transactional context (contrasting, for example, business communications from friendly personal communications), to name a few. Each of these contexts can potentially be monitored and/or sensed in a user device 11 and used to inform the adaptive input recognition and prediction engine 12 by exploiting the correlation information in the personal context model 17 as between the personal language model 32 and the various contexts 33 used.

Referring again to FIG. 2, when making 22 the statistical analysis, the process can additionally consider other material and or analysis 23 as may be available. For example, prior raw material for this individual could be processed anew in conjunction with the newly received 21 information. Or, previous analysis results for this user, including previously developed or modified personal context models, could be accessed and used to facilitate and/or supplement the analysis of the new material. For example, in one embodiment of the method the personal context model will adjust itself with usage on the device automatically. In the above-suggested examples, the additional material relates to the user himself (or herself). If desired, however, the additional material could constitute other information that, although not originating with the user, may still relate to the user in some appropriate way. For example, if standard language models are available for various professions, hobbies, cultures, and so forth, such models could be used to supplement and enrich the statistical analysis (in this way, for example, a few occurrences of the word "baby" in the user's materials could be statistically weighted more heavily if it were known that the user was a pediatrician and the word "baby" had an overall high frequency of use in a pediatrician-specific language model).

As noted, the result of this statistical analysis is to provide 24 a personal context model for a specific user. When this process is effected on the user device 11 itself, then the device 11 will simply begin to use the model. As will be shown below, however, this analysis and development of a personal context model can also be done at a remote location. In that event, the personal context model is then transmitted 25 to the relevant user device so that it may be used. Nonetheless, even in this case, the transmitted personal context model on the device can also then be modified directly on the device itself as well as use the remote location for updates to the model for more powerful versions or to transfer to or update a second device.

While it is possible for a personal context model to be developed for a given user and then used thereafter without change, it would be more beneficial to many users for the model to be updated to better ensure that changes in the user's textual content are tracked and incorporated. In this manner the model evolves naturally to the user's own changing language patterns. Such updating can be frequent, infrequent (though periodic), or driven by some non-temporal stimuli (such as by the user initiating the process when desired). The processing of updating the personal context model at the remote location can be effected both independently of the updates on the device as well as in addition to device updating. The purpose of updating at a remote location where appropriate resources (dedicated if desired) can be brought to bear are at least threefold: First, to facilitate initial use of the device 11 or corresponding product without any particular training or programming; second, to take advantage of more powerful processing and updating versions of the personal context model at the remote location; and third, to use the remote location as a medium for transferring the personal context model to other devices and also assuring that all models are in sync with the current model.

Figure 4:
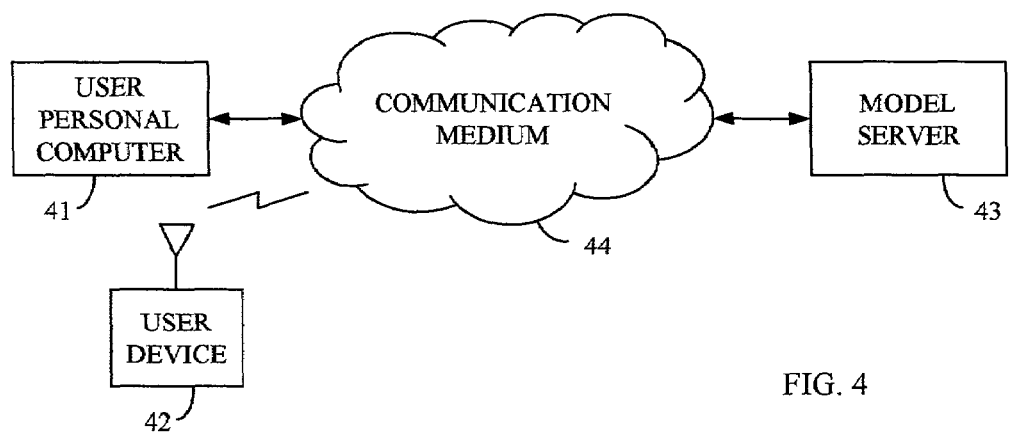
FIG. 4 comprises a block diagram depiction of a particular illustrative embodiment configured in accordance with the invention.

For example, with reference to FIG. 4, email files from a user's personal computer 41 could be communicated via a communication medium 44 (such as, for example, the Internet or an intranet or other data distribution mechanism) to a model server 43. The model server 43 can function to work the process as described above to statistically analyze the information available and to form the personal context model for the user. That personal context model can then be forwarded to a different user's device 42 (again through the communication medium 44 if available and/or through any other information delivery mechanism, such as wireless services, as available and appropriate). Through such a process, user-relevant information can be used to inform the development of a personal context model at a remote site, which model is then transferred to and used in one or more other user devices. Of course, other ways of communicating with other user devices could also be readily supported. Regardless of what services and/or connecting mediums are used, it might also be desirable to use encryption or other mechanisms to protect the confidentiality of the data during such exchanges.

As noted above, the user device 11 uses the personal context model 17 for alphanumeric information prediction purposes. More particularly, and referring now to FIG. 5, the user device 11 receives 51 alphanumeric input from the user via the user input interface 13 described above. The user device 11, using the adaptive input recognition and prediction engine 12, then uses shared or dedicated processing capability to predict 52 subsequent alphanumeric information based both upon the received user data and the personal context model 17. As one example, the user could begin a message on a wireless short message device (such as a two-way pager, a two-way personal digital assistant, or a cellular telephone with short message service capability) by addressing it to "John Doe." This alphanumeric information constitutes not only user data, but also provides context information (i.e., the identity of the recipient of the message). In addition, the user device 11 can be aware of the time of day and the day, which for purposes of this example will be 11:57 AM on a Wednesday. All of this context information can be used in conjunction with the personal context model 17 to note correlations with this user's personal language model. For example, taking the above context information into account, it may be evident that the user, under these conditions, tends to use the following words and word sequences with high frequency: "lunch," "How's about," "Bob's café," "the cafeteria," and "r u available?" These high frequency words, in context, and high frequency word sequences, are used to form the desired predictions.

In most cases the present prediction will likely be presented 53 to the user on the display 14 of the user device 11. To minimize cognitive load on the user, pursuant to a preferred embodiment, only one-word predictions are presented at a time. For example, to continue the example above, the prediction may in fact be that the next alphanumeric information to be entered by the user will be, "How's about Bob's café for lunch?" Notwithstanding this prediction, the only prediction presented will be "How's." With each acceptance of a correct prediction, the user will be offered the next prediction. In this manner a user can conceivably complete an entire sentence or message without entering additional specific text Generally speaking, the prediction mechanism should be non-intrusive, i.e., no prediction would be inserted into the text without an explicit action from the user to accept it. In the preferred embodiment, the predicted alphanumeric information will have a different visual appearance than the text already entered so far (for example in highlighted fashion) and positioned after the insertion cursor. The user may ignore it and continue entering alphanumeric data with a single input 54 instance. Conversely, a specific input 54 event could be used to accept 55 the prediction as is (as described above).

When a prediction is accepted 55, a next predicted 52 alphanumeric information is then presented 53 without requiring the user to effect entry of additional alphanumeric information. For example, upon accepting "How's" in the example above, the word "about" would be displayed. Again the word "about" would be highlighted or otherwise rendered immediately editable to allow a user to reject the prediction and seek other alphanumeric expressions. If the word "about" were accepted, however, the word "Bob's" would then be displayed as the next prediction. In this way, it is possible for entire messages to be created with only very little current textual entry by the user. Furthermore, the interface operates relatively intuitively and users can achieve success with little or no training.

If desired, and as presented in this embodiment, a timer can determine 56 whether a predetermined amount of time T has elapsed from the time a prediction is presented without the user making a subsequent input Generally speaking, a time delay of this sort can indicate that the user is not accepting the presented prediction (but has not yet determined what alphanumeric information to provide by way of substitution). When the time T is met in this way, pursuant to this embodiment, a new prediction is made and presented. Continuing the above example, "How's" and "about" may have been accepted, but the timer expired following presentation of "Bob's." The process would remove "Bob's" from the display and substitute a new prediction. For purposes of this example, if we presume that the next most statistically likely word is "the" then the word "the" would be automatically presented without further action being necessary on the part of the user. If this word were accepted, then the next predicted word would be presented (which, for purposes of this example, would be "cafeteria") as before.

The particular time period used for this purpose can be arbitrarily set, or can be modifiable by a user, and/or can be automatically alterable by the device itself. For example, the time duration can be dynamically set to match observed experience (i.e., a time T that corresponds appropriately to how long it often takes the user to respond to an inaccurate prediction with substitute alphanumeric information). In general, it is expected that this time T would tend to be shorter rather than longer, or more on the order of less than two seconds in duration.

Figure 6:
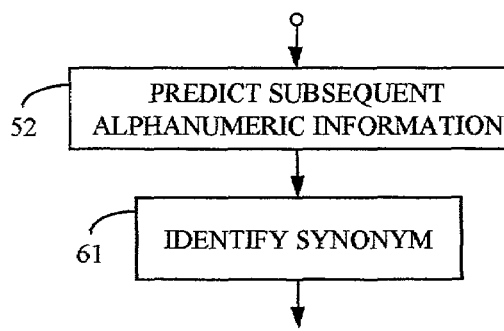
FIG. 6 comprises a detailed flow diagram depicting an alternative embodiment of a process as in accordance with the invention.
Figure 5:
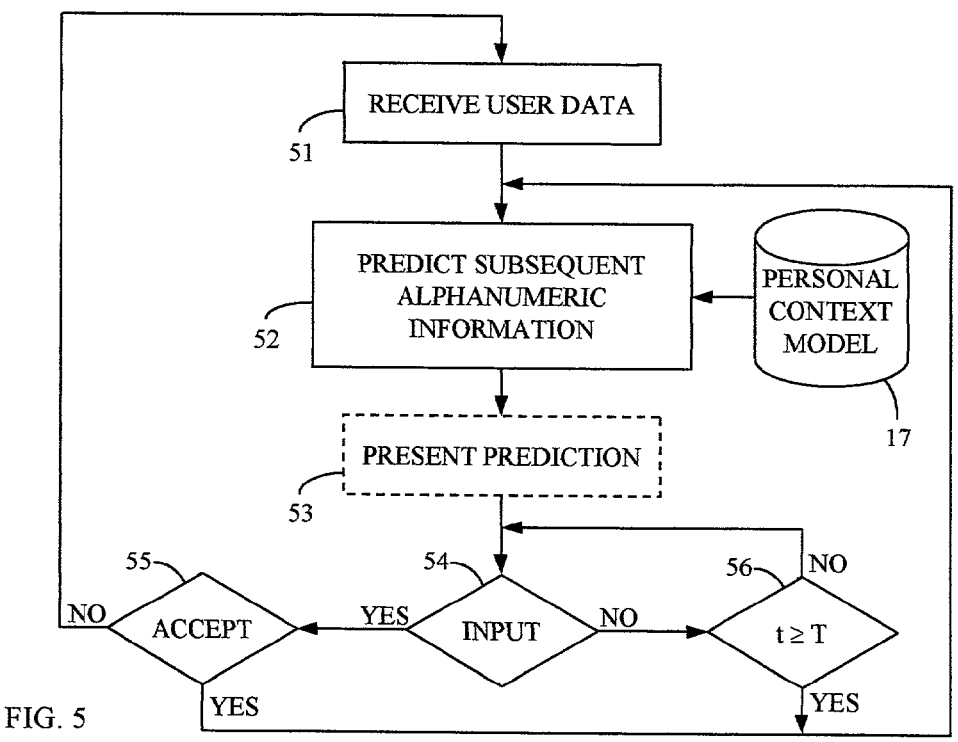
FIG. 5 comprises a flow diagram depicting various embodiments of a process as configured in accordance with the invention.

As described above, when the time T expires, a new prediction is substituted for the previous prediction. In fact, a wholly new prediction could be made as suggested, or, in the alternative, a previous candidate prediction as already made could simply be substituted at this time. Referring to FIG. 6, an alternative embodiment to that described with respect to FIG. 5 provides for an additional feature—the provision of a synonym that corresponds to a predicted alphanumeric expression. In particular, once the process has predicted 52 the next alphanumeric entry, the process can then use a digital thesaurus to identify 61 a synonym for the predicted entry and the process can then proceed as described above by presenting the synonym to the user. Such a feature should ordinarily be selectable by the user such that it can be active or inactive as desired by the user. It may also be useful in a given application to limit such a synonym function to specific parts of speech (such as nouns, verbs, adjectives, and so forth).

Figure 7:
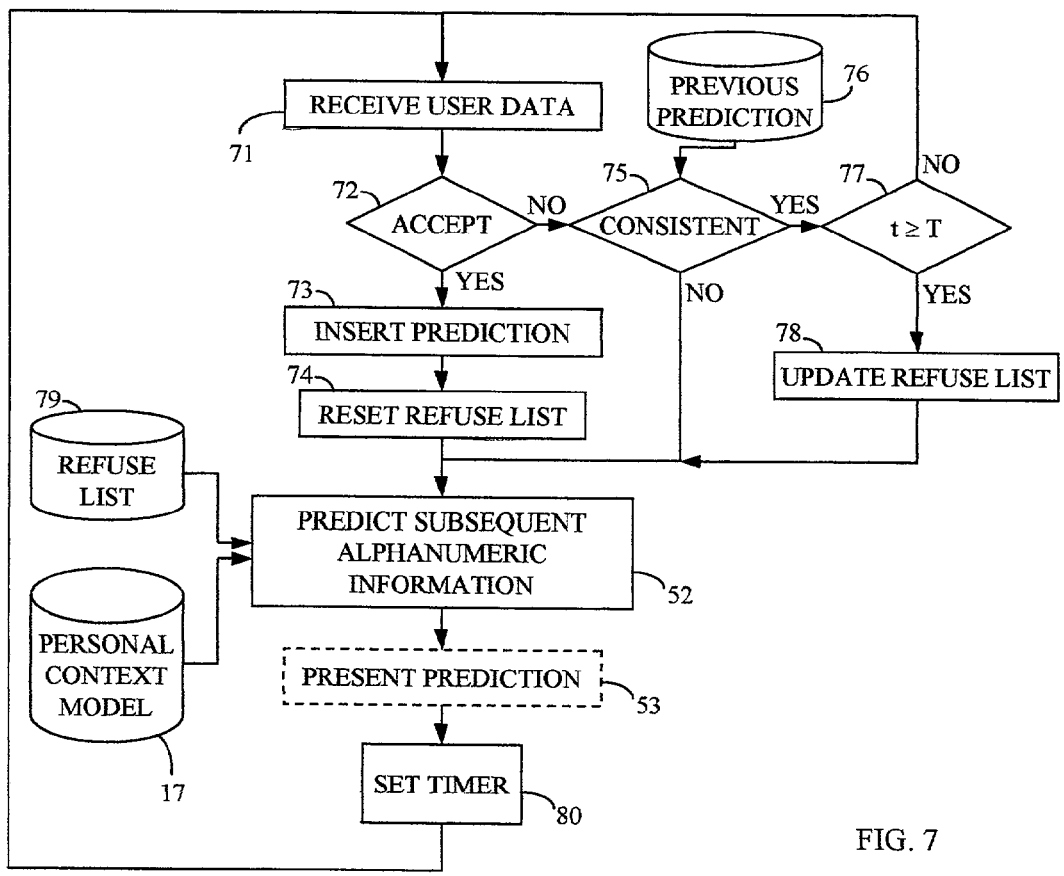
FIG. 7 comprises a flow diagram depicting yet another embodiment of a process as configured in accordance with the invention.

In the embodiments described above with respect to FIG. 5, new predictions can be displayed in the absence of receiving any inputs from the user. For some users this may be useful. In general, however, many users will probably find such a feature confusing. With reference to FIG. 7, an alternative embodiment can again receive user input 71, and then determine 72 whether that input constitutes an acceptance of a previously presented prediction. If true, then the process can insert 73 the prediction into a device 11 text buffer, reset a refused prediction list 74, and continue by predicting 52 additional subsequent alphanumeric information (again as described above and as informed by the personal context model 17), presenting 53 the new prediction, and in this embodiment, setting 80 a timer. Another alternative embodiment is depicted in FIG. 7, in that a refuse list 79 of previously unaccepted predictions for the present prediction can be maintained and used when forming a present prediction to avoid reusing an already-presented prediction that was refused by the user.

When the user input does not constitute an acceptance of a previously presented prediction, but instead provides additional information, the process determines 75 whether the information being input by the user remains consistent with the previous prediction 76, if any. If not true (either because the user input contains information that is inconsistent with the previous prediction 75 or because there is no outstanding previous prediction), then the process again makes a new prediction 52 and the process continues as described above. If, however, the information being input by the user remains consistent with the previous prediction, the process determines 77 whether the timer, if set earlier, has expired. If it hasn't, then the prediction as earlier determined remains presented and the process awaits additional input. But if the timer has expired, then the previous prediction is added 78 to the refuse list 79, the process again makes a new prediction 52, and the process continues as described above.

Consider an example to illustrate this process. A user initially enters "J." This does not constitute an acceptance nor has the timer been previously set nor is there any prior prediction. Therefore the process will make a new prediction. Based upon the contents of the personal context model 17 and whatever other context elements are available to the process, for purposes of this example we presume that the prediction comprises the word "Jonathan" which word is then displayed to the user and the timer is initiated. In rapid succession, the user then enters "o." This does not constitute an acceptance so the process will therefore determine whether the new entry remains consistent with the prior prediction. In this case, "Jo" is consistent with the prior prediction of "Jonathan," and hence the process will examine the timer. In this example, the user has acted quickly and hence the timer has not yet timed out. The process will therefore not alter the prediction and will await additional input.

Now presume that the user has paused before entering the next entry, "n" (such a pause will typically reflect that the user has looked at and considered the prediction that is presented on the display). As before, the process will note that "n" does not constitute an acceptance, but is still consistent with the prior prediction "Jonathan." However, this time the process will also note that the timer has timed out The process will therefore make a note that "Jonathan" was not accepted by the user (since presumably the user has seen the prediction and has not accepted it) and make a new prediction. For purposes of this example the new prediction is "Jones," which prediction is then presented as before and the timer begun anew. If now the user enters "a" (whether it is after a significant pause or not), the process needs to generate a new prediction, taking into account the list of all refused previous predictions for this word. At this point in our example the refuse list contains the word "Jonathan," so the next most likely word for this particular given the context is, for this example, "Jonas." This word is predicted and presented as before. The process continues this way until a prediction is accepted, or the word is terminated by the user entry of a separator (such as a space). If desired, upon receiving new user input, a determination can be made as to whether an entire word has now been completely entered without having been correctly predicted. Upon making this determination, the refuse list 79 could be cleared prior to continuing as otherwise described above.

It can be seen from the above that a pause while inputting data can be sensed and used to determine that the user has likely viewed the prediction. And, notwithstanding having likely viewed that prediction, the user has continued to enter text rather than to "accept" the prediction. This series of events can be reasonably interpreted as indicating that the user has viewed the prediction and has effectively voted to reject it by continuing to enter individual characters. By making a new prediction at this point, when otherwise it might appear that the user's entries are otherwise consistent with the prior prediction, the process can significantly increase the likelihood that a suitable prediction can be presented within a relatively short and useful period of time. Importantly, this approach is transparent to the user and requires no special training—in fact, this feature is designed to essentially reflect the ordinary behavior of the user as versus some special trained behavior. And, again, the timer can be calibrated to the individual, either by specific control or by dynamic adjustment over time. Of course, the adaptive input recognition and prediction engine 12 constantly learns from the user, so if a new word or expression is entered during the process described above, the personal context model will be updated to reflect this novelty in the user's data entry pattern.

So configured, various user devices, including particularly small devices with limited user interface capability can nevertheless be effectively utilized to quickly and easily create lengthy messages and/or make use of lengthy words and other expressions (such as, for example, email addresses, Internet URLs, and telephone numbers) notwithstanding the limited input capability of the device itself. The above-described solutions are highly scalable and are relatively effective even with only a small amount of available memory and/or processing resources (for example, a satisfactory embodiment for a cellular telephone can be realized with a personal language model containing only about 2,000 words or less as compared to the 70,000 word content of a standard dictionary). Furthermore, the personal context model can also be altered and updated from time to time to keep the model fresh and relevant to the user. Such alterations can be effected as described above or through other means. For example, the user device 11 itself can be configured to dynamically update the personal context model, either with new words, new word sequences, or new context correlations during ordinary use and/or to confirm or re-weight the existing statistical analysis represented by the personal context model. One could also maintain a most-complete personal context model for a given user (for example, at the remote location) and then to distribute smaller, scaled versions thereof to various user devices as appropriate to the size, functionality, user interface, and so forth for each such device.

A wide variety of devices and user input mechanisms can be used consistently with the above processes and embodiments. For example, these embodiments can be used in substitution for, or in combination with, so-called multi-tap entry modes, other forms of predictive (disambiguation) keypad entry, handwriting recognizers, speech recognizers, or many other input methods. Those skilled in the art will recognize that a wide variety of modifications, alterations, and combinations can be made with respect to the above-described embodiments without departing from the spirit and scope of the invention. Such modifications, alterations, and combinations are therefore to be viewed as being within the ambit of the inventive concept.

We claim:

1. A method comprising:
   receiving first data from a user representing alphanumeric information; and
   predicting at least one additional item of alphanumeric information based upon the first data and a personal context model, the personal context model including at least a personal language model and context markers that correlate to the personal language model.

2. The method of claim 1 wherein receiving first data includes detecting bio-sourced physical indicia from a user.

3. The method of claim 2 wherein detecting bio-sourced physical indicia from a user includes detecting at least one of:
   a keypad key assertion;
   tactile screen input;
   audio waves;
   electromagnetic biological signals.

4. The method of claim 2 wherein detecting bio-sourced physical indicia from a user includes detecting a plurality of sequential bio-sourced physical indicia from a user.

5. The method of claim 2 wherein detecting bio-sourced physical indicia from a user includes detecting multi-tap entry-mode bio-sourced physical indicia from a user.

6. The method of claim 2 wherein detecting bio-sourced physical indicia from a user includes detecting disambiguation entry-mode bio-sourced physical indicia from a user.

7. The method of claim 1 wherein predicting at least one additional item of alphanumeric information based upon the first data and a personal context model includes basing the prediction upon a personal context model comprising previously analyzed alphanumeric information for the user.

8. The method of claim 7 wherein basing the prediction upon a personal context model comprising previously analyzed alphanumeric information for the user includes basing the prediction at least upon previously analyzed alphanumeric information for the user as obtained from e-mail files for the user.

9. The method of claim 1 wherein predicting at least one additional item of alphanumeric information based upon the first data and a personal context model includes basing the prediction upon a personal context model comprising information content of a previously received message to which the user is replying.

10. The method of claim 1 wherein predicting at least one additional item of alphanumeric information based upon the first data and a personal context model includes basing the prediction upon a personal context model comprising information regarding at least one of:
   a recipient device to which the at least one additional item of alphanumeric information is likely to be sent;
   a recipient's name;
   a time of day;
   a given day;
   a given message subject;
   a given geographic location;
   a given transactional context.

11. The method of claim 1 and further comprising presenting predicted alphanumeric information to the user.

12. The method of claim 11 wherein presenting predicted alphanumeric information to the user comprises presenting only a single word to the user.

13. The method of claim 1 and further comprising predicting a new at least one item of alphanumeric information based at least in part upon the first data and the personal context model when at least a predetermined period of time expires without the user accepting the at least one additional item of alphanumeric information.

14. The method of claim 13 wherein predicting a new at least one item of alphanumeric information based at least in part upon the first data and the personal context model when at least a predetermined period of time expires without the user accepting the at least one additional item of alphanumeric information includes predicting a new at least one item of alphanumeric information based at least in part upon the first data and the personal context model when at least a predetermined period of time as uniquely determined for the user expires without the user accepting the at least one additional item of alphanumeric information.

15. The method of claim 1 and further comprising presenting at least one synonym that corresponds to at least one item of predicted alphanumeric information.

16. The method of claim 1 and further comprising:
   providing a first device that receives the first data;
   providing a second device that includes the personal context model; and
   providing the personal context model from the second device to the first device.

17. A method comprising:
   providing a plurality of e-mail files for a user;
   processing the plurality of e-mail files to develop a personal context model for the user, the processing including developing a personal language model for the user based, at least in part, upon an analysis of alphanumeric information usage with respect to user context; and
   using the personal context model to predict subsequent alphanumeric information when receiving input data representing alphanumeric information from the user.

18. The method of claim 17 wherein providing a plurality of e-mail files for a user includes transmitting at least some information regarding the plurality of e-mail files to a remote location.

19. The method of claim 17 wherein providing a plurality of e-mail files for a user includes providing subject matter content of the plurality of e-mail files.

20. The method of claim 17 wherein providing a plurality of e-mail files for a user includes providing at least some content from an address book.

21. The method of claim 17 wherein the analysis used in developing the personal language model for the user is based, at least in part, upon a statistical analysis of the alphanumeric information usage.

22. The method of claim 21 wherein developing a personal language model for the user based, at least in part, upon an analysis of alphanumeric information usage with respect to user context includes correlating specific alphanumeric items with specific e-mail recipients.

23. A method comprising:
   providing alphanumeric information as digitally stored by a user on a first device to a remote location;
   receiving at least portions of a personal language model for the user as based, at least in part, upon the alphanumeric information; and
   using the personal language model and context information to predict subsequent alphanumeric information when receiving input data representing alphanumeric information from the user.

24. The method of claim 23 wherein receiving at least portions of the personal language model for the user includes receiving at least portions of the personal language model for the user at a second device.

25. The method of claim 24 wherein using the personal language model to predict subsequent alphanumeric information when receiving input data representing alphanumeric information from the user includes using the personal language model to predict subsequent alphanumeric information when receiving input data at the second device representing alphanumeric information from the user.

26. The method of claim 24 wherein receiving at least portions of the personal language model for the user at a second device includes receiving at least portions of the personal language model for the user at a second device comprising a two-way wireless communications device.

27. The method of claim 24 wherein receiving at least portions of the personal language model for the user at a second device includes receiving at least portions of the personal language model for the user at a second device comprising at least one of:
   a personal digital assistant;
   a pre-recorded audio playback device;

a remote control; and
a teletext interface.

28. A method comprising:

using a personal language model for a user to predict subsequent alphanumeric information when receiving input data representing alphanumeric information from the user, which prediction is based upon the input data and a personal context model; and modifying the personal language model based upon subsequently entered input data representing alphanumeric information from the user, wherein the personal context model is user dependent and context sensitive.

* * * * *